May 24, 1960

M. A. CUTLER ET AL 2,938,096

ENCLOSURES WITH EXTERNALLY CONTROLLED
OPERATING MEANS FOR ELECTRIC SWITCHES

Filed Nov. 26, 1958

INVENTORS.
MYRON A. CUTLER,
CECIL B. TURTON
BY Robert H. Casey
ATTORNEY

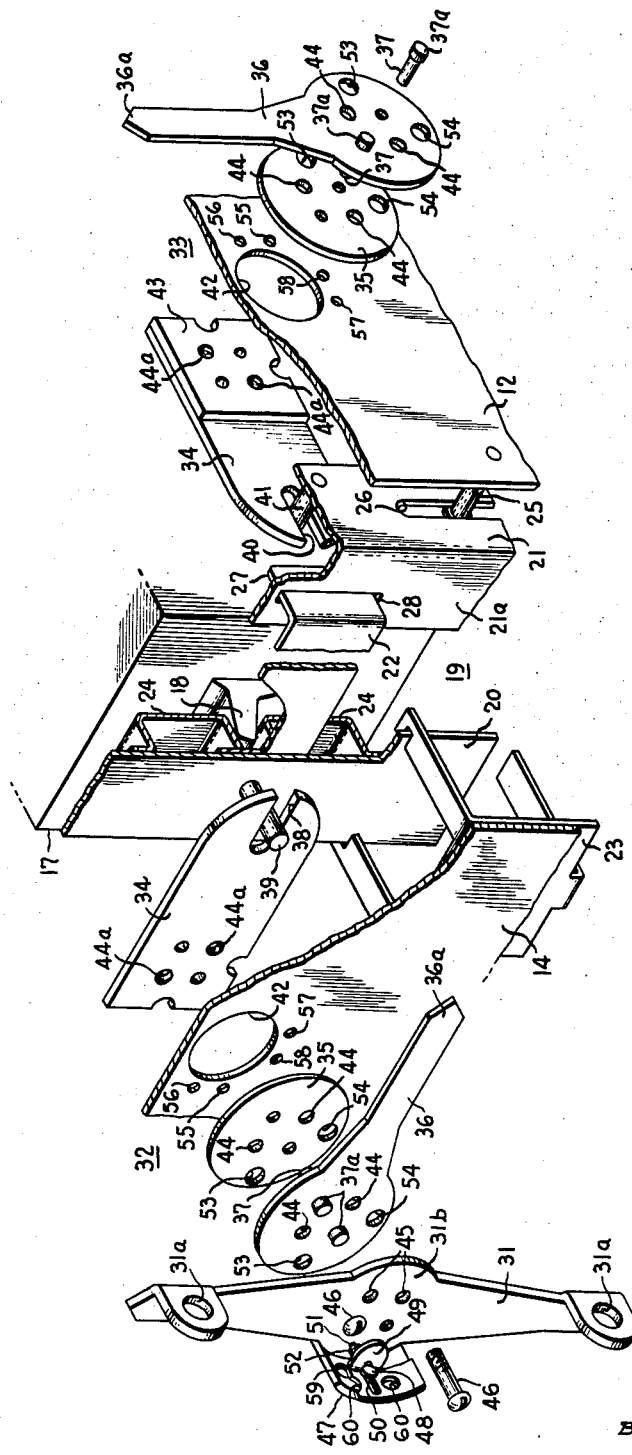

United States Patent Office 2,938,096
Patented May 24, 1960

2,938,096
ENCLOSURES WITH EXTERNALLY CONTROLLED OPERATING MEANS FOR ELECTRIC SWITCHES

Myron A. Cutler, Plainville, and Cecil B. Turton, Burlington, Conn., assignors to General Electric Company, a corporation of New York Filed Nov. 26, 1958, Ser. No. 776,542

15 Claims. (Cl. 200—168)

This invention relates to electrical apparatus including enclosures with externally controlled operating means for operating electric circuit controlling devices such as circuit breakers, safety switches and the like, contained therein, and more particularly it relates to such operating means.

It is common practice in the art of low-voltage electric power distribution and utilization to enclose circuit controlling devices, such as breakers and switches, in grounded metal boxes or housings provided with suitable means for operating the enclosed devices from outside the housings. Such an enclosure conventionally has an openable cover for providing convenient access to its interior and to the front of the enclosed device, and the externally controlled means for operating the device is supported either by a side of the enclosure or by the cover itself.

In a typical application, such enclosed circuit controlling devices are used for power tap-off purposes with busway type low-voltage distribution systems to control the supply of electric power to individual utilization circuits. Busways, which comprise elongated electrical conductors or buses housed in metal sheaths of rectangular cross-section, commonly run for long distances at relatively inaccessible locations, and usually a switch hook is needed to reach the external operating handles of the power tap-off enclosures mounted on such busways. Due to space limitations or for other reasons, the enclosures may have to be installed on edgewise or flatwise oriented horizontal or vertical busway runs. Accordingly, it is a general object of the present invention to provide an enclosure for an electric circuit controlling device having an external operating handle which may be selectively supported in any one of a number of different locations with respect to the enclosure so as to provide for relatively convenient operation of the enclosed device regardless of the position in which the enclosure is mounted.

One specific object of the invention is the provision, in an enclosure for a circuit controlling device, of a pivotally mounted external operating handle whose orientation with respect to its pivotal support may be conveniently and rapidly changed during installation of the enclosure.

Another object of this invention is to provide an enclosure having a removable external operating handle which is alternatively supportable on the cover of the enclosure or on a side of the enclosure, whereby the enclosure can be conveniently changed from front to side operation or vice versa to meet the needs of each particular installation.

Still another object of our invention is to provide an enclosure for a circuit controlling device having an improved operating mechanism adapted for side operation without obstructing or restricting convenient removal or servicing of the enclosed device through an opening provided in the front of the enclosure by an access cover.

An additional object is the provision, in an enclosure of the type referred to above, of improved means for locking the selectably located external operating handle in predetermined positions.

In carrying out our invention in one form, an enclosure for an electric circuit controlling device is provided with an openable access cover, and an operating mechanism is movably supported within the enclosure in cooperation with a switch member of the enclosed device for operating the device. The operating mechanism preferably comprises a first rectilinearly movable member carried by the cover, a second member carried by a side of the enclosure for rectilinear movement in a direction substantially parallel to the direction of movement of the first member, and a rigid interconnecting link affixed to the first member and disposed in operative engagement with the second member when the cover is closed to provide for joint rectilinear movement of both members. With this arrangement no part of the operating mechanism obstructs or restricts access to the device when the cover is open.

In order to actuate the operating mechanism from the exterior of the enclosure, an elongated operating handle is adapted to be connected to the mechanism at either one of two alternative locations. We provide suitable means associated with the enclosure side for removably mounting the external handle on the side for connection to the mechanism at one of the alternative locations, and separate means associated with the cover is provided for removably mounting the external handle on the cover for connection to the mechanism at the other of said alternative locations. Thus the external operating handle may be selectively located either on the cover or on the side of the enclosure.

In one aspect of the invention, each of the above-mentioned means for mounting the external operating handle comprises a rotatable cam member supported by the enclosure for rotation about an axis and having a hub portion accessible from the exterior of the enclosure. Each cam member is coupled in driving relation to the appropriate member of the operating mechanism. The handle is secured to the hub portion of the cam member in perpendicular relationship to the respective axis of rotation by means enabling the handle to be selectively oriented in any one of a plurality of different radial positions with respect to the hub. Pivotal movement of the operating handle about the axis of rotation will rotate the cam member and thereby actuate the operating mechanism.

In another aspect of the invention, a spring biased locking pin disposed in parallel axial relationship with the axis of rotation is supported by the operating handle at a predetermined distance from the axis of rotation. Co-operating recesses or holes for receiving the locking pin are provided in the wall of the enclosure at predetermined points on the circumference of a circle whose center is coincident with the axis of rotation and whose radius corresponds to said predetermined distance. Whenever the handle is moved pivotally to a position in which the locking pin is in alignment with one of the holes in the enclosure wall, the pin may be manipulated against its bias into the hole thereby preventing further movement of the handle. A bracket affixed to the operating handle adjacent the locking pin enables the pin to be secured in its locked condition by means of a padlock or the like.

Our invention will be better understood and its various objects and advantages will be more fully appreciated from the following description taken in conjunction with the accompanying drawings in which:

Fig. 4 is an exploded perspective view of the externally controlled operating means for the switch mounted in the enclosure of Fig. 1.

Figure 1:
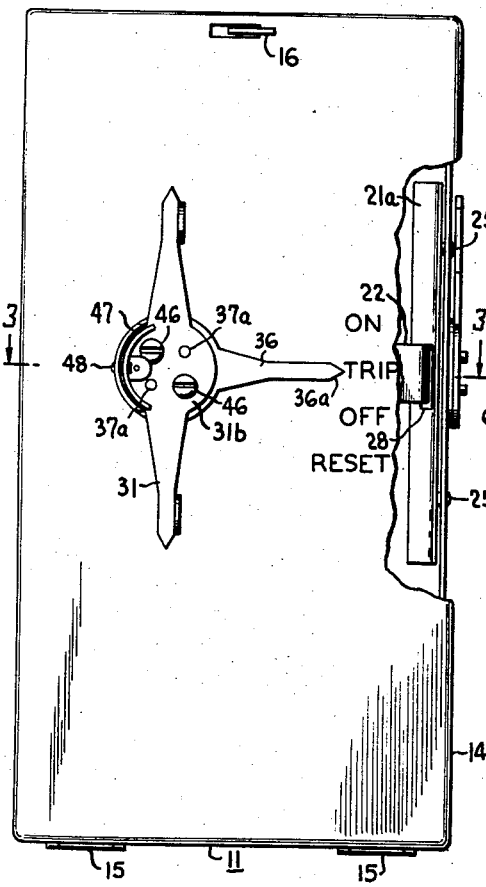
Fig. 1 is a front elevation of a switch enclosure embodying our inventon with the external operating handle shown mounted on the enclosure cover.
Figure 2:
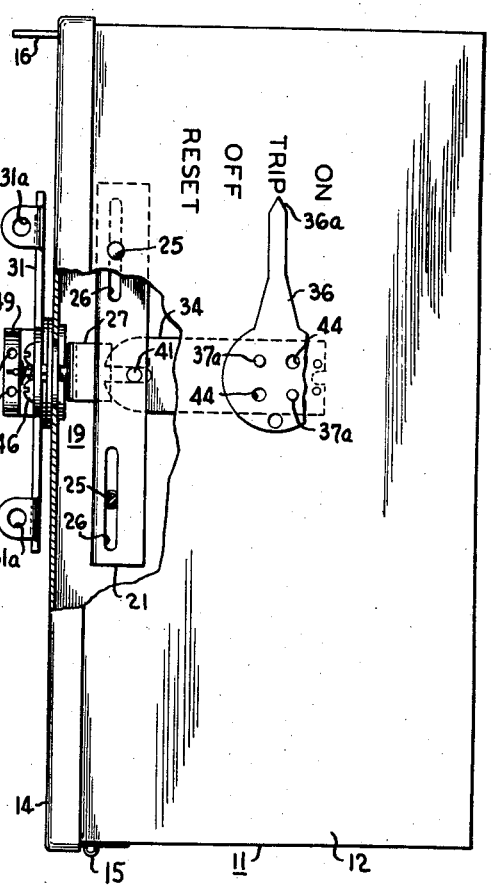
Fig. 2 is a side elevation of the enclosure of Fig. 1.

Referring now to Figs. 1 and 2, we have shown a sheet metal box or enclosure 11 inside which is mounted an electric circuit controlling device. The enclosure 11 comprises a pair of vertical sidewalls 12 and 13, and an openable cover 14 is disposed at the front of the enclosure for providing access to the interior thereof. In the illustrated embodiment of our invention, the access cover 14 is attached to the enclosure by means of a pair of hinges 15 and is releasably held by a suitable latch 16 in a closed position from which it is pivotally movable to an open position with respect to the enclosure. As mentioned hereinbefore, an enclosure such as that illustrated in the drawings is particularly well suited for use as a power tap-off unit in connection with low-voltage electric power busways.

Figure 3:
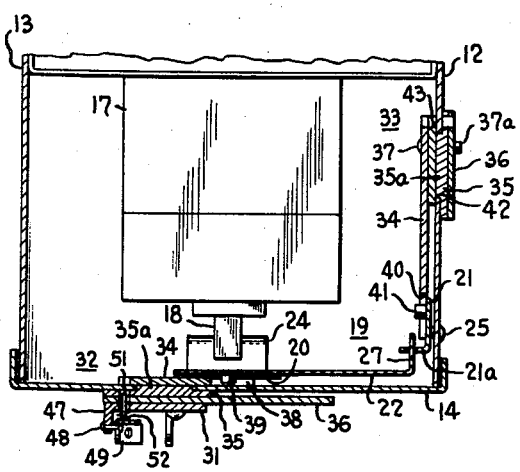
Fig. 3 is a sectional view taken along line 3—3 of Fig. 1.

The electric circuit controlling device mounted within the enclosure 11 may comprise, for example, a circuit breaker 17 which has been shown in block form in Figs. 3 and 4. The circuit breaker 17 has projecting from its front a manually operable switch member 18, for actuating suitable contacts (not shown) which make and break the electric circuit in which the breaker is connected. The breaker 17 is provided with suitable terminals (not shown) by means of which it is connected between a source of power, such as provided by a busway, and the circuit being controlled. In the conventional circuit breaker illustrated for the sake of example, the switch member 18 is pivotally movable in a vertical plane between four different positions: an "on" position in which the breaker contacts are closed; a "trip" position assumed when the breaker contacts open in automatic response to an overload condition; on "off" position to which the switch member must be turned in order to open the switch contacts manually; and a "reset" position to which the member is turned when reclosing the breaker after it has automatically tripped. The circuit controlling device 17 is operated by manual movement of its switch member 18, and in accordance with our invention this operation can be accomplished, when the cover 14 of the enclosure 11 is closed, by an externally controlled mechanism 19 movably supported within the enclosure in cooperation with the switch member 18.

As is best seen in Fig. 4, the operating mechanism 19 comprises a plate member 20, carried by the cover 14 at its inner surface, for rectilinear movement in a vertical plane parallel to the cover. The plate member 20 is slidably supported by means of suitable brackets 23, affixed to the cover as is clearly indicated in Fig. 4. The plate member 20 is arranged to be operatively coupled to the switch member 18 for operating the device 17 whenever the cover 14 is closed. This is accomplished by a pair of spaced-apart projections 24 secured to plate 20 and projecting rearwardly therefrom, the space between the projections 24 forming a horizontal trough of suitable width to receive the switch member 18 of device 17. Thus vertical movement of the plate member 20 with the cover 14 closed and switch member 18 disposed between arms 24 will cause pivotal movement of the member 18 thereby effecting operation of the device 17.

The second portion of the operating mechanism 19 comprises an oblong member 21 which is carried by the sidewall 12 of the enclosure 11 for rectilinear movement in a vertical plane parallel to the side 12. A pair of vertically aligned guide pins 25 extending inwardly from the side 12 in cooperation with vertical slots 26 in oblong member 21 provide slidable support for the member 21 adjacent the side of the enclosure. Thus oblong member 21 is movable in a direction parallel to the direction of movement of plate member 20 of the operating mechanism.

The first and second portions 20 and 21 of the operating mechanism 19 are interconnected, when the cover 14 is closed, by a transversely extending rigid link 22.

The link 22 is affixed to the plate member 20 and has a rearwardly projecting free end 27 which operatively engages the oblong member 21 whenever the cover 14 is closed to provide for joint rectilinear movement of the members 20 and 21. As is clearly seen in Fig. 4, the free end 27 of the rigid interconnecting link 22 comprises a tongue which is received in a cooperating slot 28 of the oblong member 21. The slot 28 is disposed in an inwardly turned flange 21a of the member 21, and as shown in Figs. 1 and 3 the flange 21a extends for only a relatively short distance from the sidewall 12. Since the parts 20 and 22 are carried by the cover 14, and separable from the member 21, no part of the operating member obstructs or restricts access to the interior of the enclosure 11 when the cover is open. This is desirable since it permits optimum freedom in the installation, removal and servicing of the enclosed device 17.

In accordance with our invention, the length of the tongue 27 of the interconnecting link 22 is made sufficiently great relative to the height of the projections 24 on plate member 20 to ensure that the interconnecting link 22 operatively engages the oblong member 21 of the operating mechanism during movement of the cover 14 to its closed position before the plate member 20 becomes operatively coupled to the switch member 18 of the circuit controlling device 17. This cooperation between the respective parts of the operating mechanism is necessary in order to assure that all parts of the mechanism are positively coupled together before the mechanism is in position to operate the device 17.

The operating mechanism 19 is actuated from the exterior of the enclosure by an external operating handle 31, and in accordance with our invention the operating handle 31 may be selectively mounted on the cover 14 or the side wall 12. Toward this end, the cover 14 and side wall 12 are each provided with intermediate members for removably mounting the operating handle 31 and for coupling it in driving relation to the plate member 20 and the oblong member 21, respectively, of the operating mechanism.

The aforesaid intermediate members mounted on the cover 14 comprise an arm 34a, a hub portion 35a, and a position indicating pointer 36a all securely fastened together by means of a pair of rivets 37a. The free end of the arm 34a is provided with an open-end slot 38 which receives a cooperating pin 39 of the slidably supported plate member 20. In this manner the member 34a is positively coupled to the operating mechanism 19 for movement therewith, that is, pivotal movement of the member 34a about its axis of rotation causes rectilinear movement of the plate member 20 of the operating mechanism.

The intermediate members mounted on the side wall 12 comprise similar parts, including arm 34b, hub 35b and pointer 36b. The free end of the arm 34b is provided with an eccentric open-end slot 40 which receives a cooperating pin 41 of the oblong member 21 thereby positively coupling hub 35b to the operating mechanism 19 for movement therewith.

The hub portions 35a and 36b each comprise a disk-like member having a circular raised section 35' of reduced diameter which fits loosely into a corresponding one of the holes 42 cut in the side 12 and cover 14 of the enclosure 11 respectively, the edge of each of the holes 42 providing a bushing for rotary movement of the hub. The height of the raised section 35' is slightly greater than the thickness of the enclosure wall or cover, and as is best seen in Fig. 3, the enclosure wall is trapped between the larger diameter rim of hub 35 and the arm 34. In the case of side-mounted mechanism, an additional spacing plate 43 is provided between the arm 34b and hub portion 35b. It is apparent that the hub portions 35a and 35b are accessible from the exterior of the enclosure 11.

The position indicating pointers 36a, 36b are provided with fingers 36' which point to the "on," "trip," "off," and "reset" lettered at appropriate locations on the cover 14 and sidewall 12 of the enclosure 11. See Figs. 1 and 2. These legends, of course, refer to the position of the switch member 18 of the enclosed circuit breaker 17 corresponding to the particular angular position of the rotatable cam member as identified by the pointer. Thus, as it has been illustrated in the drawings, the switch member 18 of the breaker is in its tripped position.

The rivets 37 are disposed on opposite sides of the axis of rotation of each of the hubs 35a, 35b, at equal distances therefrom, and have enlarged outer ends or heads 37a. Each of the cam members is provided with a pair of holes 44 disposed on opposite sides of the axis of rotation in quadrature with the rivets 37, the diameter of hole 44 being slightly greater than the diameter of rivet head 37a. The distance between each hole 44 and the axis of rotation is the same as the distance between each rivet 37 and the axis, and thus the centers of the holes 44 and the rivets 37 fall at 90-degree intervals on the circumference of a circle whose center is coincident with the axis of rotation. The holes 44 in the arms 34a, 34b are tapped at 44a as indicated in Fig. 4. The rivet heads 37a and holes 44 enable the external operating handle 31 to be alternatively mounted on either the front or the side of the enclosure 11, as will now be described in detail.

The operating handle 31, which is also referred to hereinafter as the actuating member for the operating mechanism is an elongated, pivotally movable member provided at opposite ends with eyelets 31a suitable for switch hook operation. A midportion 31b of the handle 31 is provided with four through holes 45, the diameters of the holes 45 being substantially equal to the diameters of holes 44 in the cam members 32 and 33. As is best seen in Fig. 4, the centers of the holes 45 in handle 31 are equally spaced on the circumference of a circle whose diameter is the same as the diameter of the circle defined by holes 44 and rivet heads 37a of the cam members. Consequently, one pair of diametrically opposed holes 45 of handle 31 may be aligned with and may receive the rivet heads 37a while the other pair of diametrically opposed holes 45 will register with holes 44 of the cam member. The operating handle 31 may now be firmly secured to the hub portion 35 of the cam member by means of a pair of bolts 46 extending through the registered holes 45 and 44 and threaded into the tapped portions 44a.

The above-described arrangement enables the operating handle 31 to be alternatively mounted on either the front or the side of the enclosure 11. By loosening the two mounting bolts 46, the handle 31 may be conveniently and rapidly removed from the hub portion 35a which is rotatably supported by the cover 14, and the location of the handle may then be changed to the side of the enclosure by inserting the bolts 46 through the appropriate pair of holes 45 and into the holes 44 located in the hub portion 35b. When mounted in either location, angular movement of the handle 31 will rotate the associated cam member thereby actuating the operating mechanism 19 disposed within the enclosure.

This arrangement also permits convenient change in the orientation of the operating handle 31 with respect to the hubs 35a, 35b. Either pair of diametrically opposed holes 45 in handle 31 may be selected for alignment with the rivet heads 37a of the cam member, and consequently the handle may be secured to the hub portion 35 of the cam member in any one of four different radial positions with respect thereto. The purpose of this feature of our invention is to enable the operating handle to be selectively oriented in a manner that results in a most advantageous direction of movement by a switch hook or the like in the particular installation of the enclosure 11.

It is desirable to be able to padlock the operating handle 31 in alternative positions corresponding to the "on" and "off" condition of the enclosed circuit controlling device. Toward this end, the midportion 31b of the operating handle 31 is provided at its outer edge with an upstanding bracket or shelf 47 having a guide pin 48 extending centrally therefrom. As has been shown most clearly in Fig. 4, an appropriately shaped carrier member 49 having an elongated slot 50 is disposed adjacent shelf 47, the guide pin 48 extending through slot 50 whereby the carrier member 49 is slidably supported on handle 31. The carrier member has a locking pin 51 disposed in parallel axial relationship with respect to the axis of pivotal movement of the handle 31, and pin 51 is located at a predetermined distance from this axis. Suitable resilient means, such as the illustrated compression spring 52, biases the carrier member 49 and its locking pin 51 in a direction away from the handle 31 and consequently these parts are normally disposed in spaced relation to the the associated wall of the enclosure 11. The head of guide pin 48 provides a stop for limiting the movement of 49 and 51 in accordance with their bias.

The locking pin 51 extends through a cooperating hole in the midportion 31b of the operating handle, and when the handle is mounted as shown in the drawings, pin 51 projects into an enlarged hole 53 located in pointer 36 and in the rim of the hub 35a. If the orientation of the operating handle were changed 90 degrees from that shown, the locking pin 51 would project into an enlarged hole 54 in the pointer and hub. In order that the operating handle 31 may be locked in either its "on" or "off" position regardless of the orientation of the handle, two sets of recesses or holes 55, 56 and 57, 58 are located in the cover 14 and in the sidewall 12 of the enclosure respectively. See Fig. 4. These holes in the wall of enclosure 11 are disposed at predetermined fixed points on the circumference of a circle whose center is coincident with the axis of rotation of the hubs 35a, 35b and whose radius is equal to the predetermined distance that locking pin 51 is located from the axis of pivotal movement of handle 31. The holes 55–58 are of appropriate diameter to receive locking pin 51. When the operating handle 31 shown in the drawings is moved to its "on" position, locking pin 51 and hole 53 will be in alignment with hole 55 in the cover 14. If the carrier member 49 is moved against its bias at this point, the locking pin 51 can be inserted into hole 55 and further movement of the operating handle will be prevented. By means of a suitable padlock or the like inserted through matching holes 59 and 60 respectively located in the upstanding shelf 47 and the carrier member 49, the locking pin may be secured in its locked condition.

The hole 56 in the enclosure wall is so located that locking pin 51 and holes 53 are in alignment therewith upon movement of the operating handle 31 to its off position, and the locking pin 51 may be manipulated against its bias into the hole 56 and padlocked therein to lock the operating handle 31 in this position. The locking mechanism would function exactly as described above if the orientation of the operating handle 31 were 90 degrees from that shown in the drawings, except that holes 57 and 58 in the enclosure wall would be involved instead of holes 55 and 56. Thus, the arrangement is such that locking of the operating handle can be accomplished in any one of its locations on the front and on the side of the enclosure 11.

While we have shown and described a preferred form of our invention by way of illustration, many modifications will occur to those skilled in the art. Therefore, we contemplate by the concluding claims to cover all such modifications as fall within the true spirit and scope of our invention.

What we claim as new and desire to secure by Letters Patent of the United States is:

1. In combination: an enclosure for an electric circuit controlling device having a movable switch member, an openable access cover at the front of the enclosure, an operating mechanism supported in the enclosure and arranged to be coupled to the switch member for operating the circuit controlling device, a pivotally movable operating handle adapted to be connected to the mechanism at either one of two alternative locations for actuating the mechanism from the exterior of the enclosure, means associated with the cover for removably mounting the handle on the cover for connection to the mechanism at one of said alternative locations, and separate means associated with a side of the enclosure for removably mounting the handle on the side for connection to the mechanism at the other of said alternative locations.

2. In combination: an enclosure for an electric circuit controlling device having a movable switch member; an openable cover for providing access to the interior of the enclosure; an operating mechanism supported within the enclosure in cooperation with the switch member for operating the device, one portion of the operating mechanism being disposed adjacent the cover when closed for movement generally parallel to the cover and another portion of the operating mechanism being disposed adjacent a side of the enclosure for movement in a plane substantially perpendicular to said cover; an intermediate member extending through the cover and coupled in driving relation to said one portion of the operating mechanism for movement therewith; another intermediate member extending through said enclosure side and coupled in driving relation to said other portion of the operating mechanism for movement therewith; and a removable actuating member adapted for alternative connection to said intermediate members for moving the intermediate member to which it is connected and thereby actuating the operating mechanism from the exterior of the enclosure.

3. In an enclosure for an electric circuit controlling device having a movable switch member: an openable access cover for the enclosure; an operating mechanism disposed within the enclosure in cooperation with the switch member for operating the device, said mechanism comprising a first portion supported by the cover for rectilinear movement in a plane parallel to the cover, a second portion supported by a side of the enclosure for rectilinear movement in a plane substantially perpendicular to said cover, and a rigid interconnecting link affixed to one of said portions and disposed in operative engagement with the other portion when the cover is closed to provide for joint rectilinear movement of both portions of the operating mechanism; an intermediate member extending through the cover and positively coupled to the first portion of the operating mechanism for movement therewith; another intermediate member extending through said enclosure side and positively coupled to the second portion of the operating mechanism for movement therewith; and a removable actuating member adapted for alternative connection to said intermediate members for moving the intermediate member to which it is connected and thereby actuating the operating mechanism from the exterior of the enclosure.

4. In an enclosure for an electric circuit controlling device having a movable switch member: an openable access cover at the front of the enclosure; an operating mechanism disposed within the enclosure in cooperation with the switch member for operating the device, said mechanism comprising a first rectilinearly movable portion carried by the cover, a second rectilinearly movable portion carried by a side of the enclosure, and a rigid interconnecting link affixed to one of said portions and disposed in operative engagement with the other portion when the cover is closed to provide for joint rectilinear movement of both portions of the mechanism; and an externally operable member mounted on said enclosure side and coupled to the second portion of the operating mechanism.

5. In combination: an enclosure for an electric circuit controlling device having a movable switch member; an openable cover for providing access to the enclosure; an operating mechanism within the enclosure comprising a first portion supported by the cover for rectilinear movement and arranged to be operatively coupled to the switch member of the device when the cover is closed, a second portion supported by a side of the enclosure for rectilinear movement in a direction substantially parallel to the direction of movement of the first portion, and a rigid transverse member affixed to one of said portions and disposed in operative engagement with the other when the cover is closed to provide for joint rectilinear movement of both portions of the mechanism; and an externally operable member mounted on said enclosure side and coupled to the second portion of the operating mechanism.

6. In an enclosure for an electric circuit controlling device having a movable switch member: a hinged access cover disposed at the front of the enclosure for movement between open and closed positions with respect thereto; an operating mechanism within the enclosure comprising a plate member slidably supported by the cover for rectilinear movement in a plane parallel to the cover and arranged to be operatively coupled to the switch member of the device when the cover is in its closed position, an oblong member slidably supported by a side of the enclosure for rectilinear movement in a direction substantially parallel to the direction of movement of the plate member, and a rigid interconnecting link affixed to the plate member and projecting rearwardly from the cover operatively engaging the oblong member when the cover is in its closed position thereby to provide for joint rectilinear movement of the plate and oblong members of the operating mechanism said mechanism being constructed and arranged so that the interconnecting member operatively engages the oblong member during movement of the cover to its closed position before the plate member becomes operatively coupled to the switch member of the circuit controlling device; and an externally operable member mounted on said enclosure side and coupled to the oblong member of the operating mechanism.

7. An enclosure for an electric circuit controlling device having a movable switch member comprising: an openable access cover at the front of the enclosure; an operating mechanism movably supported within the enclosure and arranged to be coupled to the switch member for operating the device; an elongated actuating member disposed outside the enclosure and adapted to be connected to the mechanism at either one or two alternative locations, said actuating member being arranged for pivotal movement about an axis perpendicular to its longitudinal centerline for actuating the mechanism; means associated with the cover for removably mounting the actuating member on the cover for connection to the mechanism at one of alternative locations, the actuating member when mounted on the cover being pivotally movable in a plane disposed generally parallel to the cover; and separate means associated with a side of the enclosure for removably mounting the actuating member on the enclosure side for connection to the mechanism at the other of said alternative locations, the actuating member when mounted on the side being pivotally movable in a plane disposed generally parallel to the side; each of said mounting means being arranged for alternatively mounting the actuating member in at least two different angular positions in the respective plan of pivotal movement.

8. In an enclosure for an electric circuit controlling device having a movable switch member: an openable access cover at the front of the enclosure; an operating mechanism disposed within the enclosure in cooperation with the switch member for operating the device, said mechanism comprising a first rectilinearly movable portion carried by the cover, a second rectilinearly movable portion carried by a side of the enclosure, and a rigid interconnecting link affixed to one of said portions and disposed in operative engagement with the other portion when the cover is closed to provide for joint rectilinear movement of both portions of the operating mechanism; a rotatable member mounted on said enclosure side for rotation about an axis and having a hub portion accessible from the exterior of the enclosure, said rotatable member being coupled in driving relation to the second portion of the operating mechanism; an elongated actuating member disposed normal to the axis of rotation and adapted to be connected to said rotatable member for actuating the operating mechanism from the exterior of the enclosure; and means for securing the actuating member to the hub portion of the rotatable member in any one of a plurality of different radial positions with respect thereto.

9. In combination: an enclosure for an electric circuit controlling device having a movable switch member; an openable cover disposed at the front of the enclosure for providing access to the interior thereof; an operating mechanism disposed within the enclosure in cooperation with the switch member for operating the device, said mechanism comprising a first portion supported by the cover for rectilinear movement in a plane parallel to the cover, a second portion supported by a side of the enclosure for rectilinear movement in a direction substantially parallel to the direction of movement of the first portion, and a rigid transverse member affixed to one of said portions and disposed in operative engagement with the other portion when the cover is closed to provide for joint rectilinear movement of both portions of the operating mechanism; a rotatable member having a hub extending through the cover and positively coupled to said first portion of the operating mechanism for movement therewith; a second rotatable member having a hub extending through said enclosure side and positively coupled to said second portion of the operating mechanism for movement therewith; and a removable, elongated operating handle adapted for alternative mounting on the hubs of said rotatable members for rotating the member on which it is mounted and thereby actuating the operating mechanism from the exterior of the enclosure; the hub of each of the rotatable members being arranged for mounting the operating handle in any one of a plurality of different radial positions with respect thereto.

10. An enclosure for an electric circuit controlling device having a movable switch member comprising: an openable cover for providing access to the interior of the enclosure, an operating mechanism movably supported within the enclosure and arranged to be coupled to the switch member for operating the device, a rotatable member mounted on the enclosure for rotation about an axis and having a hub portion accessible from the exterior of the enclosure, said rotatable member being positively coupled to the operating mechanism when the cover is closed, an elongated actuating member disposed generally perpendicular to the axis of rotation of said rotatable member and adapted to be connected thereto for actuating the operating mechanism from the exterior of the enclosure, and means for securing the actuating member to the hub portion of the cam member in any one of a plurality of different radial positions with respect thereto.

11. An enclosure for an electric circuit controlling device having a movable switch member comprising: an operating mechanism supported within the enclosure and arranged to be coupled to the switch member for operating the device; a rotatable member mounted on the enclosure for rotation about an axis and coupled in driving relation to the operating mechanism said rotatable member being accessible from the exterior of the enclosure; an actuating member disposed for angular movement with respect to an axis of rotation of said rotatable member and adapted to be connected thereto for actuating the operating mechanism from the exterior of the enclosure; one of said members being provided with a plurality of spaced-apart holes the centers of which are each disposed at a predetermined distance from the axis of rotation of the one member and the other of said members being provided with at least one hole the center of which is disposed at said predetermined distance from the axis of rotation of said other member, said actuating member being oriented with respect to said cam member so that said one hole registers with a selected one of said plurality of holes; and connecting means disposed in cooperation with the registered holes of said members for securely fastening the actuating member to the cam member.

12. An enclosure for an electric circuit controlling device having a movable switch member comprising: an openable cover for providing access to the interior of the enclosure; an operating mechanism supported within the enclosure and arranged to be coupled to the switch member for operating the device; a rotatable member mounted on the enclosure for rotation about an axis and having a hub portion accessible from the exterior of the enclosure, said rotatable member being positively coupled to the operating mechanism when the cover is closed, said hub portion being provided with at least one pair of threaded holes located at equal distances from the axis of rotation thereof and on opposite sides of said axis; an elongated actuating member disposed generally perpendicular to the axis of rotation of said rotatable member and adapted to be connected thereto for actuating the operating mechanism from the exterior of the enclosure, a portion of the actuating member being provided with at least one pair of through holes the centers of which are equally spaced on the circumference of a circle whose diameter is equal to the distance between the threaded holes located in the hub portion of said cam member; and means including a pair of bolts disposed in cooperation with selected ones of said through holes and said threaded holes for securing the actuating member to the hub portion of the cam member in any one of a plurality of different radial positions with respect thereto.

13. An enclosure for an electric circuit controlling device having a movable switch member comprising: an operating mechanism supported within the enclosure and arranged to be coupled to the switch member for operating the device; a rotatable member mounted on a wall of the enclosure for rotation about an axis and having a hub portion accessible from the exterior of the enclosure, said rotatable member being adapted to be coupled in driving relation to the operating mechanism; an elongated actuating member disposed generally perpendicular to the axis of rotation of said rotatable member and adapted to be connected thereto for actuating the operating mechanism from the exterior of the enclosure; means for securing the actuating member to the hub portion of the rotatable member at any one of a plurality of different radial positions with respect thereto; a spring-biased locking pin supported by the actuating member for movement in parallel axial relationship with respect to said axis of rotation, said locking pin being disposed at a predetermined distance from said axis of rotation; and a plurality of cooperating recesses provided in said enclosure wall for receiving the locking pin, said recesses being disposed at predetermined points on the circumference of a circle whose center is coincident with the axis of rotation and whose radius corresponds to said predetermined distance, whereby the locking pin is disposed in alignment with the respective recesses upon angular movement of the actuating member to appropriate positions, movement of the locking pin into a recess being effective to prevent further angular movement of the actuating member.

14. An enclosure for an electric circuit controlling device having a movable switch member comprising: an openable access cover at the front of the enclosure; an operating mechanism supported in the enclosure and arranged to be coupled to the switch member for operating the device; a pivotally movable operating handle adapted to be connected to the mechanism at either one of two alternative locations for actuating the mechanism from the exterior of the enclosure; means associated with the cover for removably mounting the handle on the cover for connection to the mechanism at one of said alternative locations; separate means associated with a side of the enclosure for removably mounting the handle on the side for connection to the mechanism at the other of said alternative locations; said cover and said side of the enclosure each being provided adjacent the respective handle mounting means with a plurality of spaced-apart recesses disposed at predetermined points on the circumference of a circle the center of which is coincident with the axis of pivotal movement of the handle when mounted on that particular part of the enclosure; and a locking pin resiliently supported by the operating handle for insertion into the respective recesses, said locking pin being spaced from the axis of pivotal movement of the handle by a distance corresponding to the radius of each circle defined by said recesses, whereby pivotal movement of the operating handle can be prevented by inserting the locking pin into a cooperating recess whenever the handle is in such a position that the locking pin lines up with a recess.

15. An enclosure for an electric circuit controlling device having a movable switch member comprising: an operating mechanism supported in the enclosure and arranged to be coupled to the switch member for operating the device, an operating handle mounted on a wall of the enclosure for angular movement with respect to an axis of rotation and adapted to be connected to said mechanism for actuating said mechanism from the exterior of the enclosure, a plurality of spaced-apart recesses located in the enclosure wall at predetermined points on the circumference of a circle whose center is coincident with the axis of rotation of the operating handle, a cooperating locking pin insertable into said recesses, a carrier member for said locking pin resiliently supported by the operating handle in spaced relation from the enclosure wall, said locking pin being disposed in parallel axial relationship with said axis of rotation at a distance from said axis corresponding to the radius of the circle defined by said recesses, whereby the locking pin is moved to positions of alignment with the respective recesses for insertion therein by appropriate angular movement of the operating handle, and an upstanding bracket affixed to the operating handle adjacent the carrier member in cooperation therewith, said bracket and carrier member having provisions for padlocking the locking pin when it is inserted into a recess in which condition the operation handle cannot be angularly moved.

References Cited in the file of this patent

UNITED STATES PATENTS

| | | |
|---|---|---|
| 1,333,874 | Platt | Mar. 16, 1920 |
| 2,216,298 | Rowe | Oct. 1, 1940 |
| 2,370,877 | Robbins | Mar. 6, 1945 |
| 2,418,006 | Bangert | Mar. 25, 1947 |
| 2,765,383 | Cooper et al. | Oct. 2, 1956 |